United States Patent
Kondo

(10) Patent No.: US 6,190,555 B1
(45) Date of Patent: Feb. 20, 2001

(54) APPARATUS AND METHOD FOR BIOLOGICAL TREATMENT OF WASTEWATER

(76) Inventor: Masao Kondo, 205 Coorsdale Dr., Cary, NC (US) 27511

(*) Notice: Under 35 U.S.C. 154(b), the term of this patent shall be extended for 0 days.

(21) Appl. No.: 09/252,267

(22) Filed: Feb. 18, 1999

(51) Int. Cl.⁷ ...................................................... C02F 3/10
(52) U.S. Cl. ........................ 210/615; 210/150; 210/220; 210/497.1
(58) Field of Search ...................................... 210/615, 620, 210/150, 220, 221.2, 483, 232, 496, 497.1; 261/94; 422/312

(56) References Cited

U.S. PATENT DOCUMENTS

| | | | |
|---|---|---|---|
| 4,422,930 | * 12/1983 | Hatanaka | 210/615 |
| 4,680,111 | * 7/1987 | Ueda | 210/150 |
| 5,194,231 | * 3/1993 | Gough et al. | 210/150 |
| 5,262,051 | 11/1993 | Iwatsuka | 210/615 |
| 5,380,439 | 1/1995 | Gilson | 210/615 |
| 5,389,247 | 2/1995 | Woodside | 210/151 |
| 5,399,266 | 3/1995 | Hasegawa et al. | 210/615 |
| 5,423,988 | * 6/1995 | Yamasaki et al. | 210/615 |
| 5,500,111 | 3/1996 | Fujino | 210/150 |
| 5,526,656 | 6/1996 | Conroy, Jr. et al. | 66/193 |

FOREIGN PATENT DOCUMENTS 64-34496  * 2/1989 (JP).
1-249194  * 10/1989 (JP).

OTHER PUBLICATIONS

Brochure by BioMatrix Technologies, Inc. entitled "Wastewater Treatment Systems" no date given.
Brochure by Ringlace Products, Inc. entitled "Ringlace Attached Growth Bio–Media" Apr. 1998.

* cited by examiner

Primary Examiner—David A. Simmons
Assistant Examiner—Frank M. Lawrence
(74) Attorney, Agent, or Firm—Olive & Olive, P.A.

(57) ABSTRACT

An aerobic microorganism growth medium for use in a wastewater treatment system is formed as a resilient coil of fibrous strand material suspended on a frame placed in a vessel containing the wastewater to be treated.

15 Claims, 5 Drawing Sheets

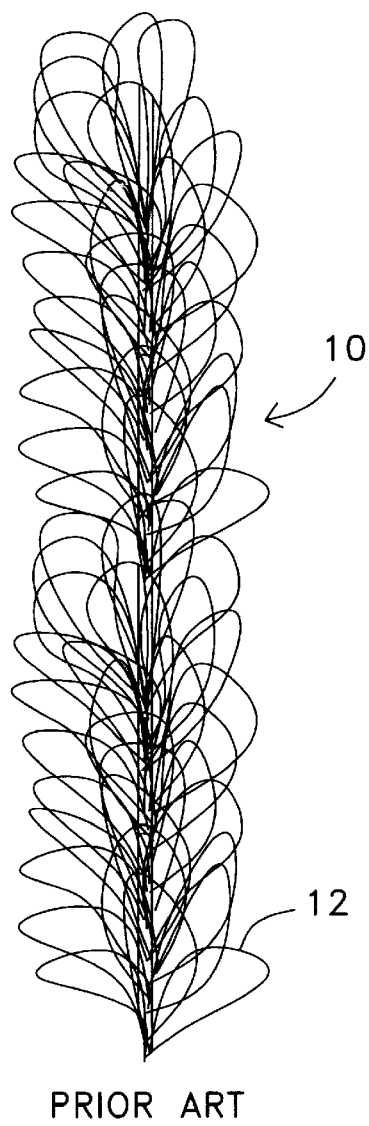
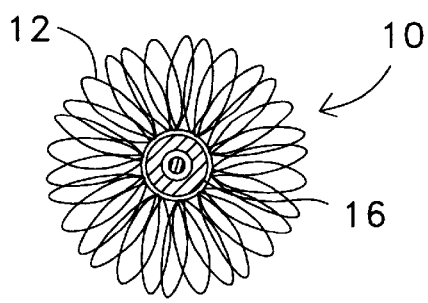
PRIOR ART
FIG. 1
FIG. 3
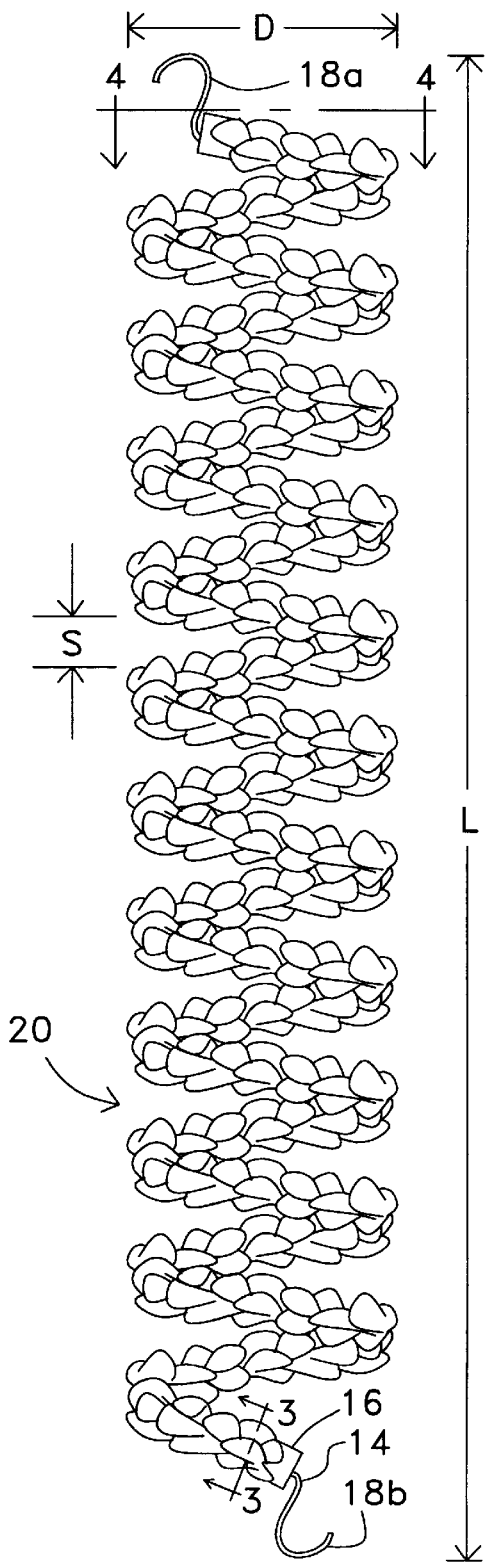
FIG. 2

APPARATUS AND METHOD FOR BIOLOGICAL TREATMENT OF WASTEWATER

BACKGROUND OF THE INVENTION

1. Field of the Invention

The invention relates generally to the type of wastewater treatment system in which wastewater microorganisms are permitted to grow on a medium supported in a vessel containing the wastewater being treated but more specifically to a novel medium and medium support arrangement for such a system operating under aerobic conditions.

2. Background of the Invention

In aerobic wastewater treatment systems of the kind in which microorganisms are permitted to grow on a medium, it has been known to support the ends of relatively straight fibrous strands having tiny loops on a frame which permits a great number of such strands and having substantial surface area to be held vertically and closely spaced apart in a vessel holding the wastewater being treated. Such a system is shown in literature distributed by Ringlace Products, Inc. of Portland, Oreg. and which illustrates the company's "Ringlace™" strand product made of polyviniylidane chloride fibers.

Another system of the kind being described is shown in U.S. Pat. No. 5,262,051 in which bundles of synthetic fiber provide surface area for the growth of microorganisms and are illustrated being supported in a zig-zag fashion on a frame which in turn is supported within a vessel containing the wastewater being treated. Useful background information is also given in the '051 patent.

U.S. Pat. No. 5,500,111 illustrates a growth supporting medium incorporating continuous S-shaped portions and, as shown in FIG. 5 of the '111 patent, is made up as a collection of individual, short, spiral shaped units which are randomly placed in a vessel in which the wastewater is treated.

In FIG. 1 of U.S. Pat. No. 5,389,247, there is also shown a configuration in which synthetic ribbon-like contact members having a large number of projecting fluffs or loops are supported in a vertical sinusoidal array.

In summary, it can be seen that there have been many prior attempts to gain surface area in bacteria supporting medium by varying the kind of medium on which growth takes place and the manner in which the medium is supported in order to gain sufficient treatment of water. Prior attempts have also sought to provide a medium that can be made economically and that minimizes the need for cleaning and backwashing.

Accordingly, it is an object of the invention to provide a further improved system in which a uniquely configured medium is employed in the vessel in which the wastewater is treated and to use this medium as a means for obtaining a substantial increase in the surface area available for growth of microorganisms. Other objects will become apparent as the description proceeds.

SUMMARY OF THE INVENTION

The invention is directed to providing a bacterial growth medium formed by the method of coiling a type of strand having numerous loops providing growth surface area so as to multiply and substantially increase the amount of such surface area. The invention is further directed to mounting a plurality of the coiled strands such that their coils are substantially evenly spaced thereby enhancing the flow of the wastewater and minimizing retention of sludge solids and the like thereby minimizing the need for cleaning and backwashing and overall providing a system that is both economical to produce as well as operate.

DESCRIPTION OF THE DRAWINGS

FIG. 1 is an elevation view of a short section of the type of growth medium strand used in the invention.

FIG. 2 is a side elevation view of a growth medium strand of the type shown in FIG. 1 wrapped on a supporting tube and wire and formed into a helix that is ready to be supported according to the invention.

FIG. 3 is a section view taken generally in the direction of line 3—3 in FIG. 2.

DETAILED DESCRIPTION OF PREFERRED EMBODIMENTS OF THE INVENTION

Making reference initially to FIG. 1, there is shown a somewhat magnified and schematic view of the type of microorganism growth strand 10 found suited to the invention. Strand 10 represents the previously described "Ringlace™" polyvinylidene chloride fiber strand having numerous filament formed loops 12 for forming the desired microorganism growth surface area.

Figure 4:
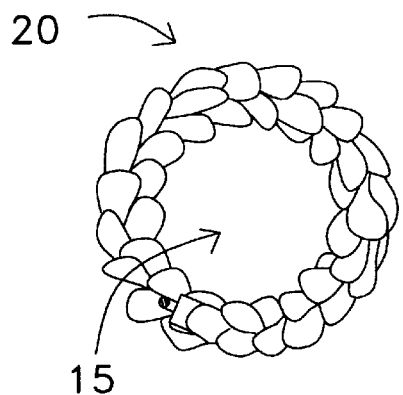
FIG. 4 is a plan view of the helix of FIG. 2 taken in the direction of line 4—4 in FIG. 2.

The invention provides a means for concentrating the loops 12 so as to form a massive amount of growth surface area in a relatively small space and making such concentrated growth surface area accessible to the microorganisms whose growth is intended to be fostered. Further, this massive amount of growth surface area is achieved in a way which minimizes retention of sludge solids in the coiled strand. These results are achieved by forming the strand 10 into a unique helically coiled strand 20 (FIG. 2) a plurality of which are suited to being installed on a frame 30 (FIG. 4) and placed in a wastewater treatment system 60 as later explained. For purposes of this invention, the words "coil" or "coiled" refer to a helical shape as illustrated in FIGS. 2 and 4.

Figure 8:
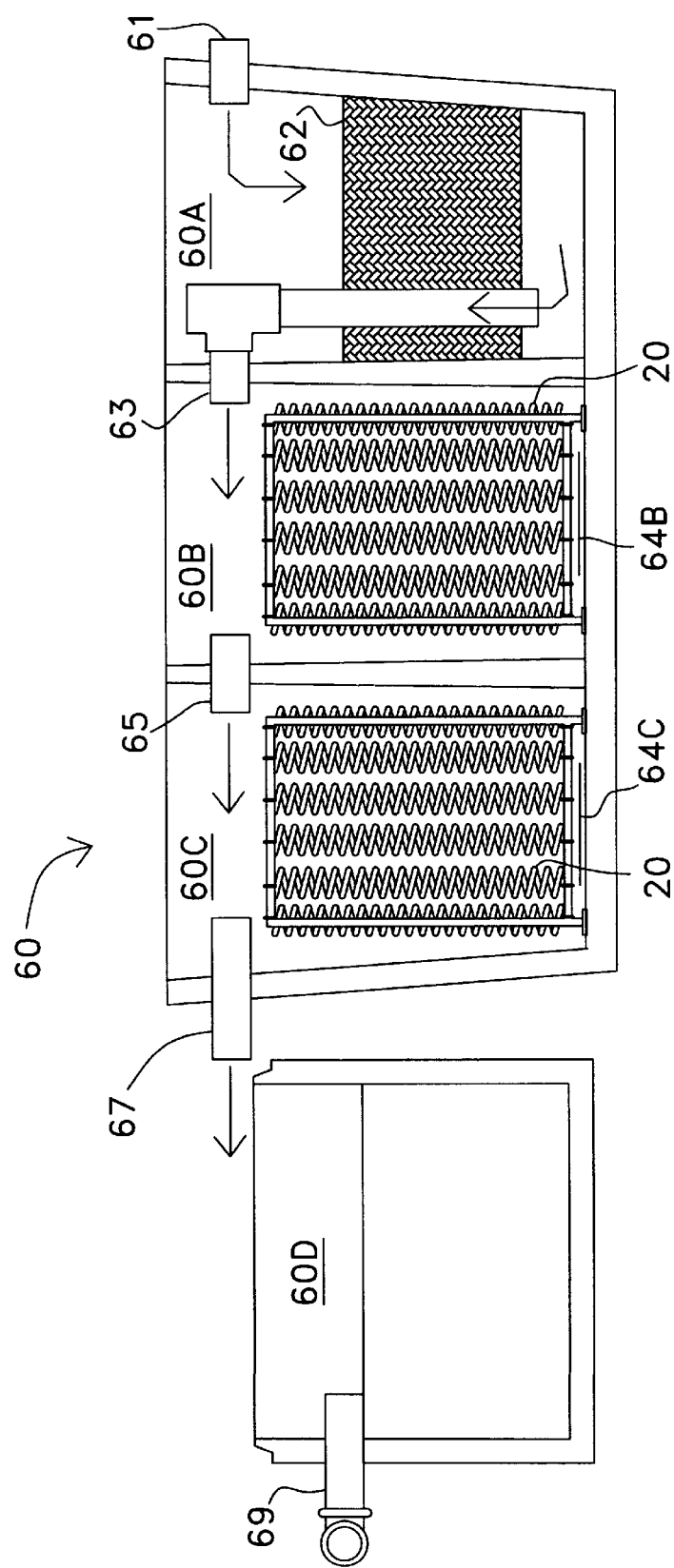
FIG. 8 is a schematic elevation view of a wastewater treatment system utilizing the coiled growth medium strands of the invention.

Each helically coiled strand 20 is made up by first inserting a length of relatively strong, resilient but bendable wire 14 in a length of plastic tube 16 and bending exposed ends of wire 14 at opposite ends of tube 16 into the form of hooks 18a, 18b as seen in FIG. 2. A continuous length of fiber strand 10 (FIG. 1) is then wound around tube 16 such that each section of fiber strand 10 assumes a very close and relatively tight relation against adjacent sections and forms a "fibrous jacket" of loops 12 surrounding tube 16. The ends of fiber strand 10 are then cut to length as required and suitably secured to tube 16 by adhesive, wire strapping or other suitable means, not shown. The helically coiled strand 20 comprising the wire 14, tube 16 and length of fiber strand 10 tightly wrapped around tube 16 is then bent into the form of a helical stretchable coil as depicted in FIG. 2 having a series of interconnected sections that tend when slightly stretched to have substantially even spacing S. The tube 16 and wire 14 effectively form a semi-rigid core which tends to retain the shape to which it is bent. Each helically coiled strand 20 is further characterized by having a central opening 15 (FIG. 4) through which both air and wastewater liquid can pass to enhance the desired aerobic action in the hereafter described system 60 (FIG. 8).

The "fibrous jacket" of loops 12 surrounding tube 16 can be formed numerous different ways. For example, the loops may first be formed into a "jacket" and then slipped over tube 16. The "core" described above as being a tube surrounding a wire could also be comprised solely of semi-rigid plastic, wire, or other appropriate material known in the art.

Referring again to FIG. 2, the length L, in a relaxed condition, and diameter D will vary with the size of the frame 30 on which the helically coiled strands 20 are mounted. In general, the characteristics of wire 14, tube 16 and relaxed length L are chosen such that each helical coil strand 20 is semi-rigid and will be slightly stretched when installed on frame 30 and such that the coil spacing S will be substantially even throughout the length L when the helical coil strand 20 is stretched.

Figure 5:
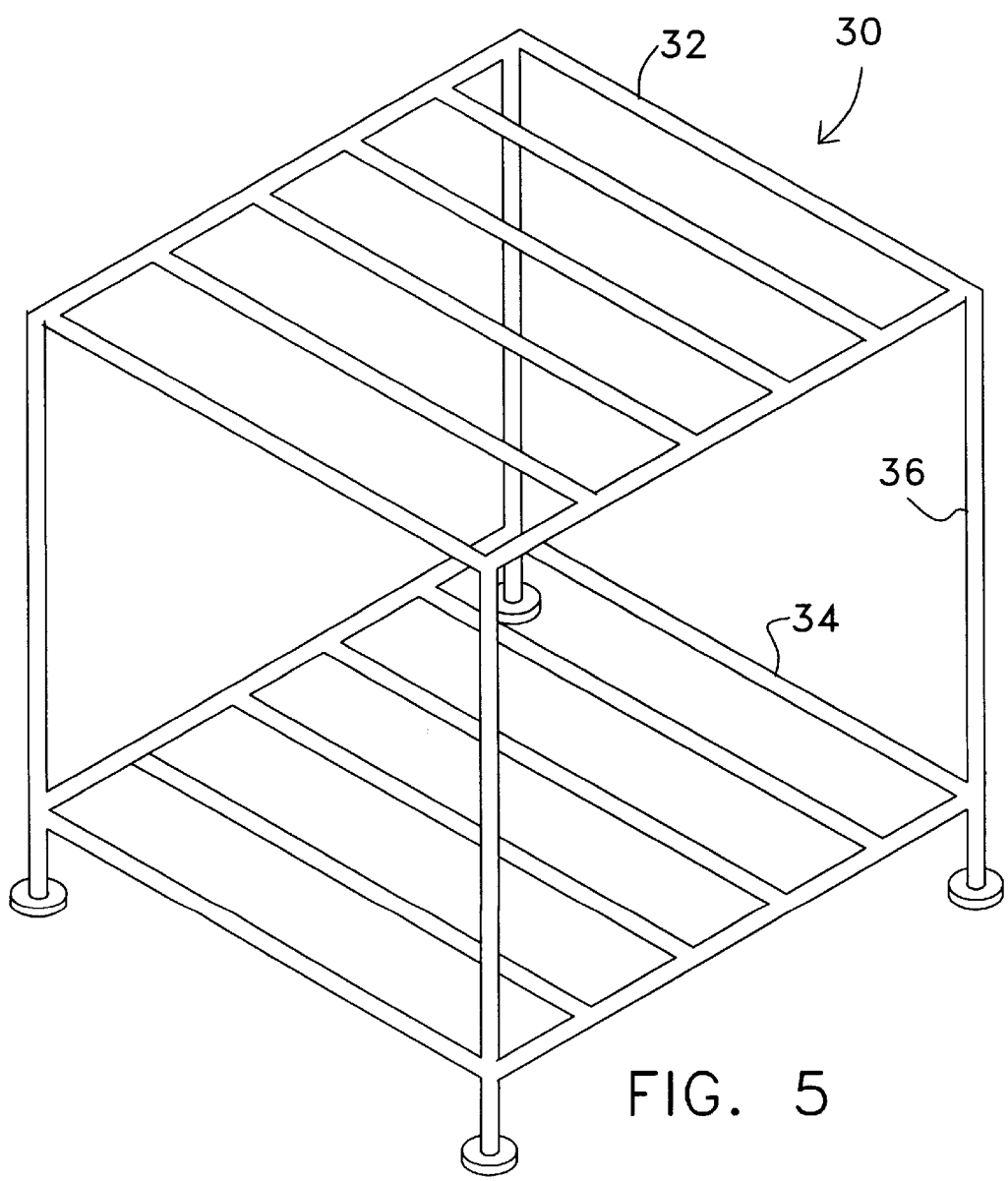
FIG. 5 is a perspective view of a frame of the type used to support a plurality of coiled growth medium strands of the type shown in FIG. 2 in a vessel containing the wastewater being treated.
Figure 6:
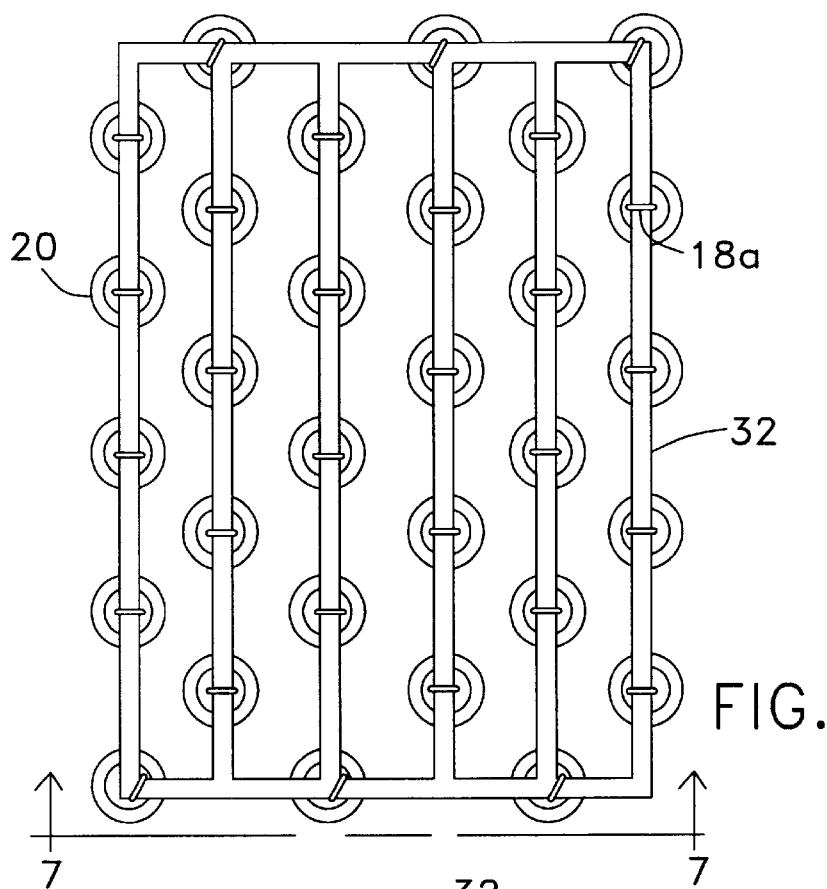
FIG. 6 is a plan and somewhat schematic view of the frame of FIG. 4 mounting a plurality of the helical coils of the invention of the kind shown in FIG. 2.
Figure 7:
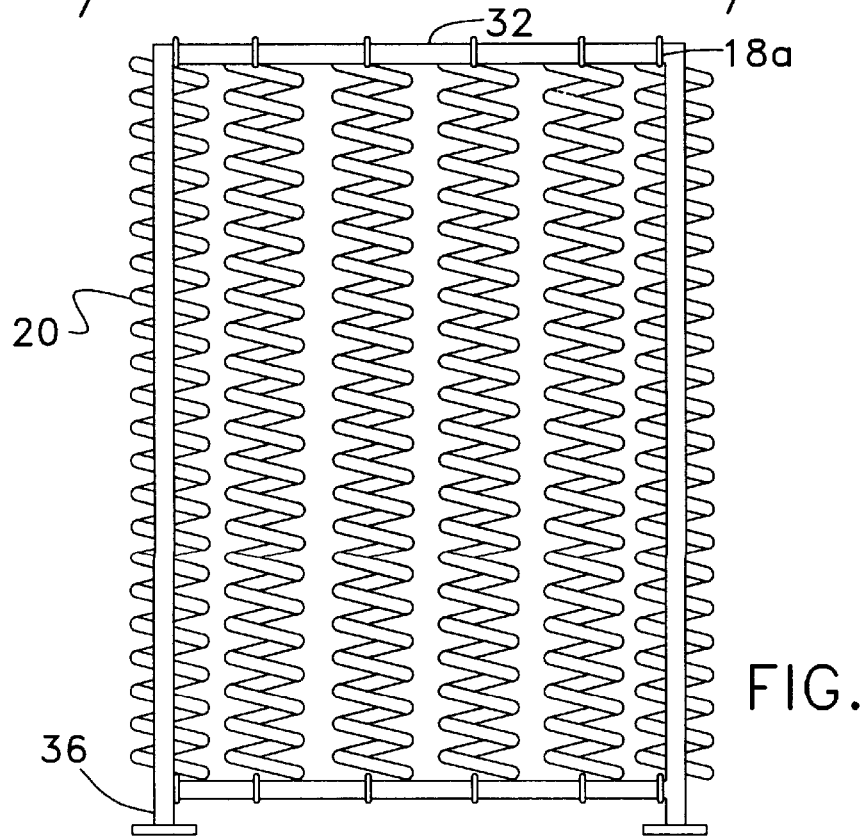
FIG. 7 is an elevation view of the frame of FIG. 5 taken in the direction of line 7—7 of FIG. 6

Referring to FIG. 5, helically coiled strands 20 once assembled in sufficient quantity for purposes of the invention are mounted on the previously referred to frame 30 by means of the respective upper and lower hooks 18a, 18b. Hooks 18a, 18b are secured to respective plural, laterally spaced and parallel, upper support bars 32 which are vertically spaced above and opposite the plural, laterally spaced and parallel lower support bars 34 both of which sets of bars are joined to comer posts 36. FIGS. 6 and 7 illustrate the general appearance of frame 30 once loaded with the selected number of coiled strands 20 and ready to be placed in a vessel in which the wastewater is treated as next explained in reference to FIG. 7.

FIG. 8 illustrates a wastewater treatment system 60 of the kind to which the helically coiled, growth medium strands 20 of the invention are applied. Pumping apparatus, level controls, and the like are not shown for purposes of simplifying the drawing. System 60 employs a series of treatment vessels in a cascade-like arrangement in which the raw wastewater is first transferred through an inlet pipe 61 to an anaerobic treatment vessel 60A having appropriate anaerobic media 62 and from which the anaerobic treated wastewater is transferred through transfer pipe 63 to an aerobic treatment vessel 60 B in which is mounted one of the previously described frames 30 loaded as illustrated in FIGS. 6 and 7 with the coiled, growth medium strands 20 of the invention. The now aerobic treated wastewater is next transferred from aerobic treatment vessel 60B to aerobic treatment vessel 60C through transfer pipe 65. Aerobic vessel 60C, like aerobic treatment vessel 60B, also contains a frame 30 loaded with another group of helically coiled growth medium strands 20. In each aerobic treatment vessel 60 B, 60 C are respective diffusers 64 B, 64 C connected to a source of pressurized air, not shown, and which serve to generate air bubbles for release into vessels 60 B, 60 C and subsequent ascent through and around coiled strands 20. Aerobic microorganisms naturally exist in the wastewater being treated and are therefore supplied with the wastewater to each said aerobic treatment vessel 60 B, 60 C, where they attach to coiled strands 20. The plurality of helically coiled, growth medium strands 20 provide the substantial increase in surface area and corresponding substantial increase in points of attachment available for the growth of the aerobic microorganisms.

In a final stage of treatment, the now once anaerobically treated and twice aerobically treated wastewater is transferred through transfer pipe 67 to a clarifier vessel 60D from which the treated wastewater exists through outlet pipe 69.

Figure 9:
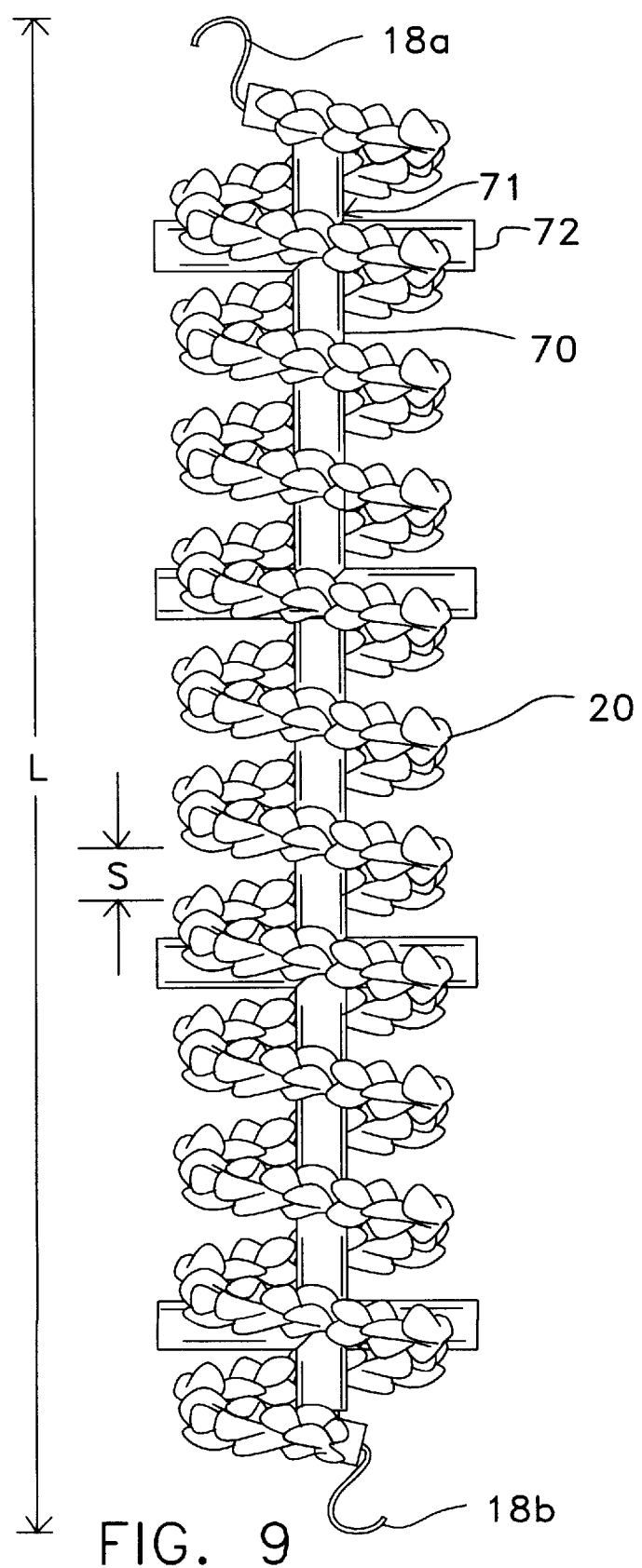
FIG. 9 is a side elevation view of a second embodiment of the invention in which the helical coils of the wrapped growth medium strands of the invention as illustrated in FIG. 2 are held in an evenly spaced apart relation by a rigid support structure.

From what has been described, it will be understood that in the first embodiment, the substantially even spacing S (FIG. 2) of the coiled growth medium strand 20 of the invention is both established and maintained by reason of the semi-rigid strand 20 being stretched between the respective upper and lower support bars 32, 34 of frame 30. In a second embodiment illustrated in FIG. 9, each of the coiled strands 20 is mounted on a bar structure 71 having a central vertical pipe member 70 and a series of outwardly extending, vertically spaced, pairs of horizontal support bars 72. In this second embodiment, the interconnected spirals of the coiled strand 20 are made to rest on successive pairs of horizontal support bars 72 as best seen in FIG. 9 and thus the spacing S is regulated both by the horizontal support bars 72 as well as by the tension imposed on the helically coiled strand 20 by each successive pair of horizontal support bars 72. In the second embodiment of the invention, coiled strand 20 may be less rigid than the coiled strand of the first embodiment, as support bars 72 of the second embodiment provide the support needed to maintain spacing S throughout length L. In both embodiments, there is retained the massive amount of growth surface area provided by the unique coiled growth strand of the invention as well as a growth structure which minimizes retention of sludge solids and provides passages for both air and liquid flow within and through the structure to facilitate the desired treatment.

What is claimed is:

1. A method for forming and utilizing a microorganism growth structure in an apparatus for treating wastewater, comprising the steps of:

(a) forming a plurality of fibrous coils, each said coil having a tube surrounding a bendable material of sufficient rigidity to maintain its shape;

(b) forming a frame having coil support means;

(c) suspending each of said plurality of coils on said frame between said coil support means;

(d) establishing a vessel for receiving wastewater to be treated and sized for receiving said frame containing said suspended plurality of coils; and (e) installing said frame with said suspended plurality of coils in said vessel.

2. A method as claimed in claim 1, further comprising the step of utilizing said wastewater as a source for providing aerobic microorganisms for attachment to said fibrous coils.

3. A method as claimed in claim 2, further comprising the step of releasing air bubbles into said vessel for ascent through and around said fibrous coils and said aerobic microorganisms.

4. A method for forming and utilizing a microorganism growth structure in an apparatus for treating wastewater, comprising the steps of:

(a) forming a plurality of fibrous coils, each said coil being formed of a fibrous strand continuously wrapped around a core formed of a jacket surrounding a bendable material having sufficient rigidity to maintain the shape to which it is bent and being bent to establish the shape of said coil;

(b) forming a frame having upper and lower horizontal support rods and interconnected frame members supporting said rods;

(c) suspending said plurality of coils on said frame between and supported on said rods;

(d) establishing a vessel for receiving wastewater to be treated and sized for receiving said frame containing said suspended plurality of coils; and (e) installing said frame with said suspended plurality of coils in said vessel.

5. A method as claimed in claim 4 including the step of suspending said coils on said frame in a manner designed to maintain the individual sections of said coils substantially evenly spaced apart.

6. A method as claimed in claim 5, including the step of forming said core with a metal wire bent to said shape.

7. Apparatus for treating wastewater, comprising:

(a) a helical coil formed of a tube around a bendable wire that is sufficiently rigid to maintain its shape;

(b) a fibrous jacket wrapped around said tube of said coil;

(c) a frame having upper and lower coil support means;

(d) means for suspending a plurality of said coils on said frame between said coil support means; and (e) a vessel for receiving wastewater to be treated and sized for receiving said frame containing said suspended plurality of coils.

8. An apparatus as claimed in claim 7, wherein said upper and lower coil support means is comprised of upper and lower horizontal support rods positioned such that that when said plurality of coils are suspended therein, individual sections of each said coil are substantially evenly spaced apart.

9. An apparatus as claimed in claim 7, including a rod structure associated with each said coil and supported by said frame and having horizontal arms members engaging and operative to maintain the individual sections of each said coil substantially evenly spaced apart.

10. An apparatus as claimed in claim 7, wherein said vessel is an aerobic treatment vessel.

11. Apparatus for treating wastewater, comprising:

(a) a plurality of fibrous coils, each said coil being formed of a fibrous strand wrapped around a core formed of a Jacket surrounding a bendable material having sufficient rigidity to maintain the shape to which it is bent and being bent to establish the shape of said coil;

(b) a frame having upper and lower horizontal support rods and interconnected frame members supporting said rods;

(c) means for suspending each of said plurality of coils on said frame between said rods; and (d) a vessel for receiving wastewater to be treated and sized for receiving said frame containing said suspended plurality of coils.

12. An apparatus as claimed in claim 11 including for each said coil operative in conjunction with said means for suspending each of said plurality of coils on said frame and the resiliency of each said coil to maintain the individual sections of each said coil substantially evenly spaced apart.

13. An apparatus as claimed in claim 11 wherein said core of bendable material includes a metal wire.

14. An apparatus as claimed in claim 11 wherein said bendable material comprises a metal wire and said jacket comprises a plastic tube surrounding said wire.

15. An apparatus as claimed in claim 11 including a rod structure associated with each said coil and supported by said frame and having horizontal arm members engaging and operative to maintain individual sections of each said coil substantially evenly spaced apart.

* * * * *